United States Patent [19]
Lee et al.

[11] Patent Number: 5,448,369
[45] Date of Patent: Sep. 5, 1995

[54] APPARATUS FOR A HIGH DEFINITION VCR WHICH SELECTS A VIDEO SIGNAL CHARACTERISTIC TO BE TRANSMITTED DEPENDING ON CHARACTERISTICS OF THE TAP AND CHANNEL

[75] Inventors: Dong H. Lee; Seung I. Kim; Tae S. Yang; Choon Lee, all of Seoul, Rep. of Korea

[73] Assignee: Goldstar Co., Ltd., Seoul, Rep. of Korea

[21] Appl. No.: 195,012

[22] Filed: Feb. 14, 1994

[30] Foreign Application Priority Data

Feb. 13, 1993 [KR] Rep. of Korea ............... 2022/1993
Apr. 30, 1993 [KR] Rep. of Korea ............... 7454/1993
Apr. 30, 1993 [KR] Rep. of Korea ............... 7455/1993

[51] Int. Cl.$^6$ ................. H04N 5/76; G11B 5/00; G11B 5/09; G11B 5/035
[52] U.S. Cl. .................. 358/335; 360/32; 360/65
[58] Field of Search ............ 358/310, 335, 342, 320, 358/323, 327, 328, 330, 336, 337, 340; 360/32, 33.1, 29, 27, 36.1, 65; H04N 5/76, 5/92, 5/78, 5/781, 5/782, 5/783, 9/79, 9/89, 5/94, 5/95, 5/91

[56] References Cited

U.S. PATENT DOCUMENTS

| | | | |
|---|---|---|---|
| 5,136,391 | 8/1992 | Minami | 358/310 |
| 5,175,631 | 12/1992 | Juri et al. | 358/310 |
| 5,191,431 | 3/1993 | Hasegawa et al. | 358/335 |
| 5,298,992 | 3/1994 | Pietras et al. | 358/310 |

FOREIGN PATENT DOCUMENTS

| | | |
|---|---|---|
| 0369756 | 5/1990 | European Pat. Off. |
| 0469861 | 2/1992 | European Pat. Off. |
| 4118533 | 12/1992 | German Dem. Rep. |

OTHER PUBLICATIONS

Minoru Yoneda et al., An Experimental Digital . . ., IEEE Transactions on Consumer Electronics, vol. 37, No. 3, Aug. 1991, pp. 275–282.
Patent Abstracts of Japan, vol. 8, No. 86, Apr. 19, 1984.
Patent Abstracts of Japan, vol. 12, No. 407, Oct. 27, 1988.
JP-A-63-059287, Mar. 15, 1988.
IEEE Transactions on Consumer Electronics, vol. 35, No. 3, Aug. 1989, pp. 450–457, C. Yamamitsu et al.

Primary Examiner—Tommy P. Chin
Assistant Examiner—Thai Tran

[57] ABSTRACT

A signal characteristic variation apparatus for a high definition VCR in which a characteristic of a video signal is varied according to characteristics of a tape and a channel. A predetermined frequency band of test signal is recorded on the tape for recording the tape and channel characteristics in a recording mode. This enables the video signal to be recorded on the tape in the proper mode and permits, in the play-back mode, the tape and channel characteristics to be discriminated by detecting the test signal recorded on the tape. Therefore, the video signal can be played back from the tape with its frequency characteristic properly adjusted according to the discriminated tape and channel characteristics.

7 Claims, 8 Drawing Sheets

1 Pixel resolution

FIG. 6

2 Pixel resolution

FIG. 7

1 Pixel resolution

FIG. 8

8 Pixel resolution

APPARATUS FOR A HIGH DEFINITION VCR WHICH SELECTS A VIDEO SIGNAL CHARACTERISTIC TO BE TRANSMITTED DEPENDING ON CHARACTERISTICS OF THE TAP AND CHANNEL

BACKGROUND OF THE INVENTION

1. Field of the Invention

The present invention relates in general to a high definition video cassette recorder (referred to hereinafter as VCR) connected to a high definition television receiver, and more particularly to a signal characteristic variation apparatus for the high definition VCR in which a characteristic of a video signal transmitted is varied according to characteristics of a tape and a channel for recording and playback of the video signal.

2. Description of the Prior Art

Figure 1:
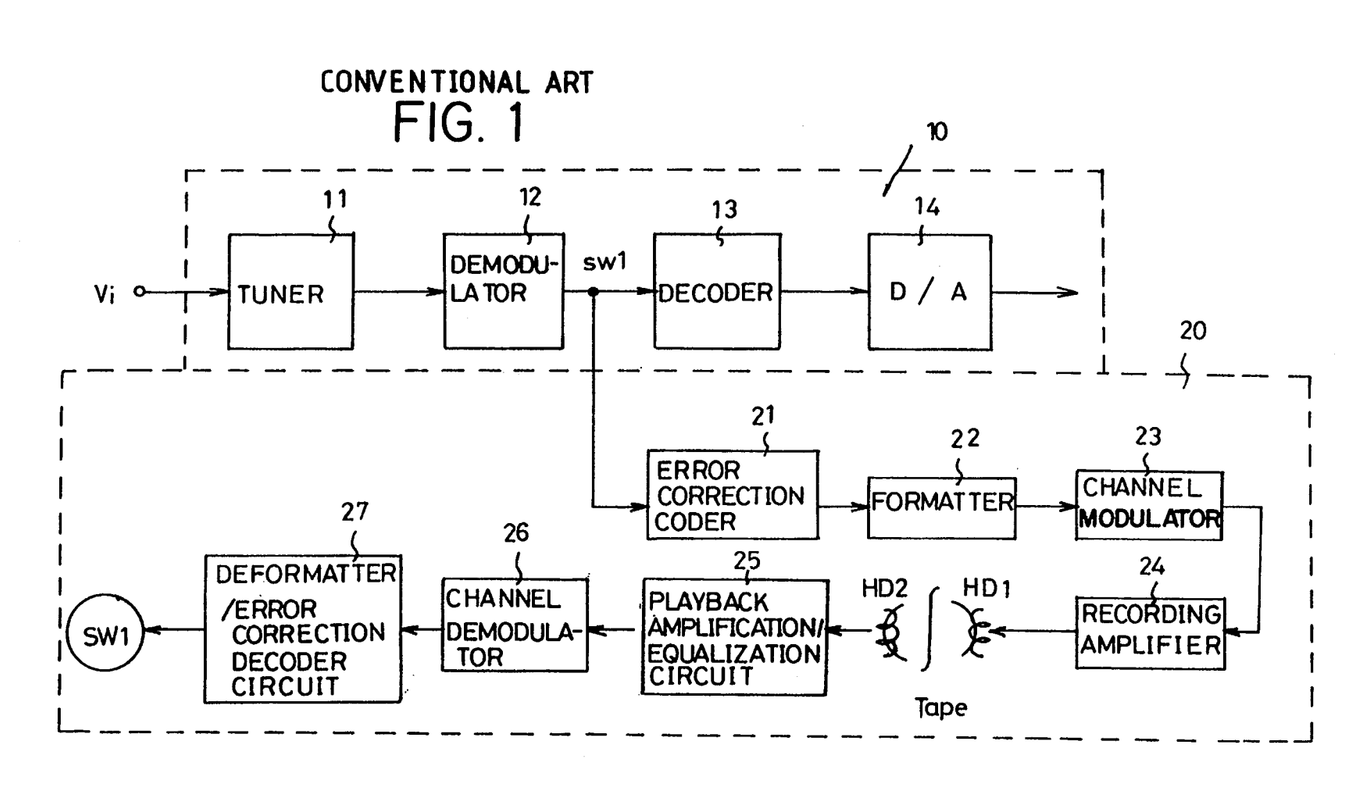
FIG. 1 is a block diagram of a convention high definition VCR connected to a high definition television receiver.

Referring to FIG. 1, there is shown a block diagram of a conventional high definition VCR connected to a high definition television receiver. In this drawing, the high definition VCR is designated by the reference numeral 20 and the high definition television receiver is designated by the reference numeral 10. The high definition television receiver 10 is adapted to receive a compressed high definition video signal transmitted from a broadcasting station and display the received video signal through a monitor (not shown) thereof. The high definition VCR 20 is adapted to record the high definition video signal received by the high definition television receiver 10 on a tape, play back the high definition video signal recorded on the tape and display the played back video signal through the monitor of the high definition television receiver 10.

The high definition television receiver 10 comprises a tuner 11 for detecting the compressed high definition video signal Vi from the broadcasting station, received through an antenna (not shown), a demodulator 12 for demodulating the detected video signal from the tuner 11 into a state before its modulation, a decoder 13 for receiving the demodulated video signal from the demodulator 12 through a switch SW1 when the high definition television receiver 10 is selected by the user and decoding the received video signal to expand it into a state before its compression, and a digital/analog (D/A) converter 14 for converting the decoded video signal from the decoder 13 into an analog video signal.

The high definition VCR 20 comprises an error correction coder 21 for receiving the demodulated video signal from the demodulator 12 through the switch SW1 when a recording mode of the high definition VCR 20 is selected by the user and adding an error correction code to the received video signal, a formatter 22 for formatting an output signal from the error correction coder 21 in a recording format on the tape, a channel modulator 23 for modulating an output signal from the formatter 22 suitably to a channel characteristic, a recording amplifier 24 for amplifying an output signal from the channel modulator 23 by a predetermined level, and a head HD1 for recording an output signal from the recording amplifier 24 on the tape.

Also, the high definition VCR 20 comprises a head HD2 for playing back a data stream of the video signal recorded on the tape when a playback mode of the high definition VCR 20 is selected by the user, a playback amplification/equalization circuit 25 for amplifying the data stream played back by the head HD2 by a predetermined level and compensating for a distortion of the amplified data stream, a channel demodulator 26 for demodulating an output signal from the playback amplification/equalization circuit 25 suitably to the channel characteristic, and a deformatter/error correction decoder circuit 27 for deformatting an output signal from the channel demodulator 26 into the original state, correcting an error of the resultant video signal and outputting the error-corrected video signal to the decoder 13 through the switch SW1.

The operation of the conventional high definition VCR with the above-mentioned construction will hereinafter be described.

First, in the case where the high definition television receiver 10 is selected by the user, the video signal compressed and modulated in the broadcasting station is received by the antenna and then tuned by the tuner 11. The tuned video signal from the tuner 11 is demodulated into the state before its modulation by the demodulator 12. In the demodulator 12, there is extracted and corrected an error component inserted into the video signal in the transmission. The demodulated video signal from the demodulator 12 is applied to the decoder 13 through the switch SW1.

the decoder 13 decodes the received video signal to expand it into the state before its compression. The decoded video signal from the decoder 13 is converted into the analog video signal by the D/A converter 14 and then displayed through the monitor.

On the other hand, in the case where the recording mode of the high definition VCR 20 is selected by the user, the switch SW1 is switched to transfer the demodulated video signal from the demodulator 12 to the error correction coder 21. The error correction coder 21 adds the error correction code to the demodulated video signal from the demodulator 12 to remove an error component to be generated in the recording of the video signal on the tape. Then, the formatter 22 formats the output signal from the error correction coder 21 in the recording format on the tape.

The output signal from the formatter 22 is modulated by the channel modulator 23 suitably to the channel characteristic corresponding to the head, the tape or the recording amplifier, so that it can be recorded at a limited recording frequency. The output signal from the channel modulator 23 is amplified by the predetermined level by the recording amplifier 24 and then recorded on the tape by the head HD1.

In the case where the playback mode of the high definition VCR 20 is selected by the user, the data stream of the video signal recorded on the tape is played back by the head HD2 and then amplified by the predetermined level by the playback amplification/equalization circuit 25. Also, the playback amplification/equalization circuit 25 compensates for the distortion of the amplified data stream. Then, the output signal from the playback amplification/equalization circuit 25 is demodulated by the channel demodulator 26 into the state before the modulation by the channel modulator 23.

The output signal from the channel demodulator 26 is deformatted into the original state by the deformatter/error correction decoder circuit 27. Also, the deformatter/error correction decoder circuit 27 corrects an error component of the resultant video signal generated in the recording and playback.

Then, the error-corrected video signal from the deformatter/error correction decoder circuit 27 is applied to the decoder 13 in the high definition television receiver 10 through the switch SW1. The decoder 13 decodes the received video signal to expand it into the state before its compression. The decoded video signal from the decoder 13 is converted into the analog video signal by the D/A converter 14 and then displayed through the monitor of the high definition television receiver 10.

Noticeably, an analog video signal of an NTSC or PAL system can be recorded at a frequency band of 5 MHz on a VCR tape of a VHS system. Also, in the case of a S-VHS system, the analog video signal can be recorded at a frequency band of 7 MHz. On the other hand, a digital video signal receivable by the high definition television receiver has an information amount much (at least 5 times) more than that of the analog video signal. For this reason, the digital video signal must be recorded at a density much higher than that of the analog video signal.

Therefore, the future-oriented high definition VCR can record the high definition video signal at a very high recording speed on high quality tapes of MP and ME systems as well as the SVHS system, differently from the existing analog VCR. Namely, the high definition video signal can be recorded at a frequency band of 15 MHz by the high definition VCR. By the way, in the high definition VCR, a channel characteristic or a recording/playback characteristic of the digital video signal is determined according to a characteristic of the tape as a recording medium. In this connection, the digital video signal may recorded and played back properly when the tape has a small capacity. The improper recording and playback of the digital video signal results in a degradation in a picture quality.

SUMMARY OF THE INVENTION

Therefore, the present invention has been made in view of the above problem, and it is an object of the present invention to provide a signal characteristic variation apparatus for a high definition VCR in which a characteristic of a video signal transmitted is varied according to characteristics of a tape and a channel, so that recording and playback of the video signal can stably be performed, resulting in prevention of a degradation in a picture quality.

In accordance with the present invention, the above and other objects can be accomplished by a provision of a signal characteristic variation apparatus for a high definition video cassette recorder, comprising scaling means for selecting an output signal from an encoder or data (variable length-coded motion data, control data and) from a decoder in a television receiver under a control of a first switch and formatting the selected signal or data into a data stream; variable length coding means for coding the output signal from said encoder or motion data, control data and DCT coefficient data from said decoder at a variable length and outputting the coded data to said scaling means; scale control means for outputting a scale control signal to said scaling means according to a selected one of recording modes; error correction coding means for adding an error correction code to an output signal from said scaling means; formatting means for formatting an output signal from said error correction coding means in a recording format on a tape; channel modulation means for modulating an output signal from said formatting means at a frequency band suitable to tape and channel characteristics; test signal generation means for generating a test signal in response to a switching control signal which is generated according to the selected recording mode and passing the generated test signal at a predetermined frequency band, the test signal from said test signal generation means being used to discriminate the tape and channel characteristics; recording amplification means for amplifying an output signal from said channel modulation means or the test signal from said test signal generation means by a predetermined level under a control of a second switch; first and second heads for recording an output signal from said recording amplification means on the tape; third and fourth heads for playing back a video signal or the test signal recorded on the tape in a playback mode; playback amplification means for amplifying the video signal or the test signal played back by said third and fourth heads by a predetermined level; tape characteristic detection means for receiving an output signal from said playback amplification means under a control of a third switch and discriminating the tape and channel characteristics in response to the received signal; equalization means for compensating for a distortion of the output signal from said playback amplification means in response to a first output signal from said tape characteristic detection means; channel demodulation means for demodulating an output signal from said equalization means at a frequency band suitable to the tape and channel characteristics in response to a second output signal from said tape characteristic detection means; deformatting and error correction decoding means for deformatting an output signal from said channel demodulation means into the original state and correcting an error of the resultant data stream; and inverse scaling means for performing inverse scaling of an output signal from said deformatting and error correction decoding means to extract the motion data, the DCT coefficient data and the control data therefrom and outputting the extracted data to said first decoding means in the television receiver.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 2:
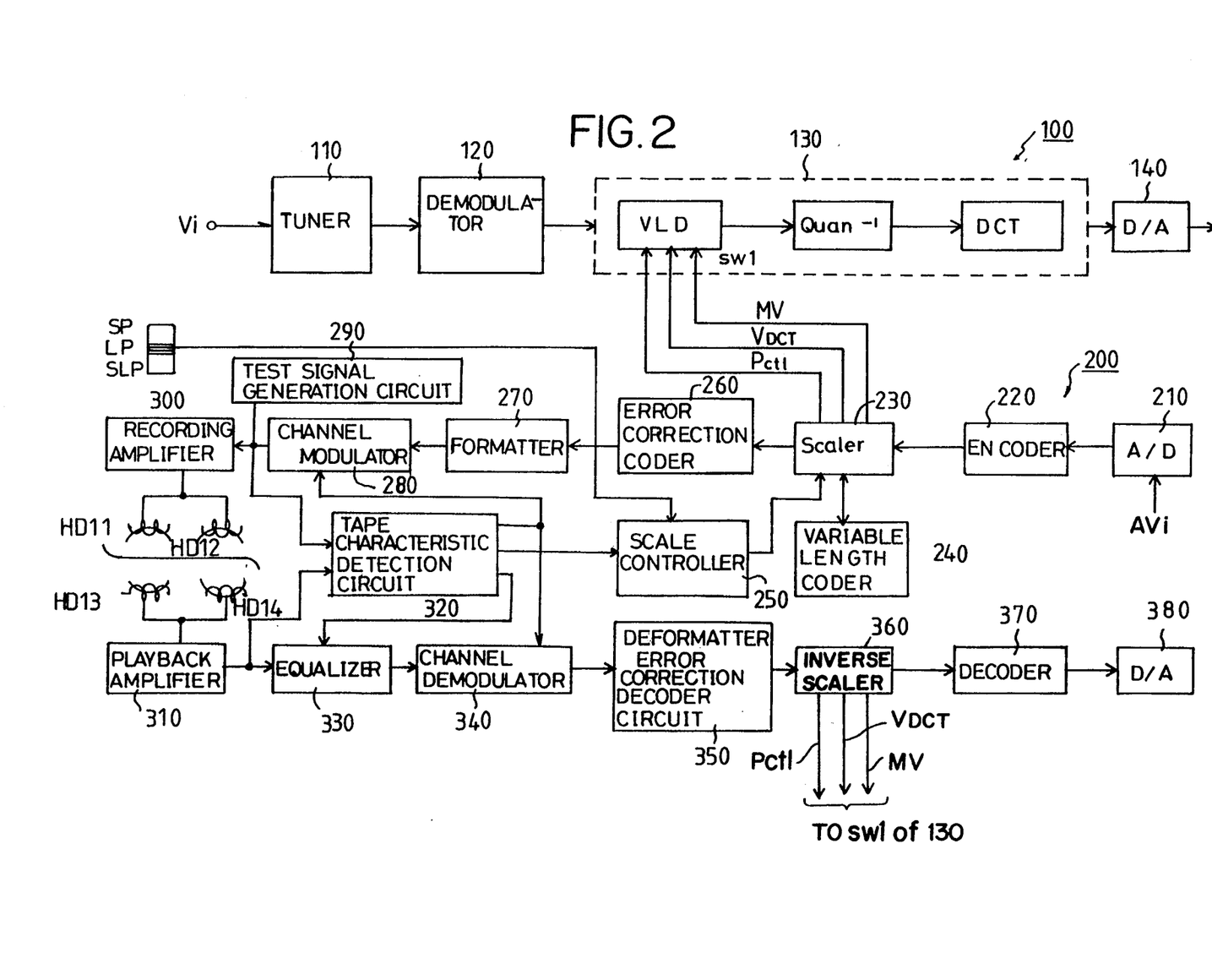
FIG. 2 is a block diagram of a signal characteristic variation apparatus for a high definition VCR connected to a high definition television receiver in accordance with an embodiment of the present invention.

Referring to FIG. 2, there is shown a block diagram of a signal characteristic variation apparatus for a high definition VCR connected to a high definition television receiver in accordance with an embodiment of the present invention. In this drawing, the high definition VCR is designated by the reference numeral 200 and the high definition television receiver is designated by the reference numeral 100. The high definition television receiver 100 is adapted to receive a compressed high definition video signal transmitted from a broadcasting station and display the received video signal through a monitor (not shown) thereof. The high definition VCR 200 is adapted to record the high definition video signal received by the high definition television receiver 100 on a tape, to play back the high definition video signal recorded on the tape and to display the played back video signal through the monitor of the high definition television receiver 100.

The high definition television receiver 100 comprises a tuner 110 for detecting the compressed high definition video signal Vi from the broadcasting station, received through an antenna (not shown), and a demodulator 120 for demodulating the detected video signal from the tuner 110 into a state before its modulation.

A decoder 130 is provided in the high definition television receiver 100 to extract motion data MV, DCT coefficient data $V_{DCT}$ and control data Pctl from the demodulated video signal from the demodulator 120, decode the extracted data MV, $V_{DCT}$ and Pctl at a fixed length and perform inverse quantization and inverse DCT of the decoded data.

Also, the high definition television receiver 100 comprises a digital/analog (D/A) converter 140 for converting an output signal from the decoder 130 into an analog signal.

The high definition VCR 200 comprises an analog/digital (A/D) converter 210 for receiving an analog video signal AVi from a view finder of a camera or a camcorder (not shown) and converting the received analog video signal into a digital video signal, an encoder 220 for encoding an output signal from the A/D converter 210, a scaler 230 for formatting an output signal form the encoder 220 or the output data MV, $V_{DCT}$ and Pctl from the decoder 130 in the high definition television receiver 100 into a data stream, a variable length coder 240 for coding the output signal from the encoder 220 or the output data MV, $V_{DCT}$ and Pctl from the decoder 130 at a variable length and outputting the coded data to the scaler 230, and a scale controller 250 for outputting a scale control signal to the scaler 230. The scale control signal from the scale controller 250 is determined according to a selected one of recording modes SP, LP and SLP.

Also, the high definition VCR 200 comprises an error correction coder 260 for adding an error correction code to an output signal from the scaler 230, a formatter 270 for formatting an output signal from the error correction coder 260 in a recording format on the tape, and a channel modulator 280 for modulating an output signal from the formatter 270 at a frequency band suitable to tape and channel characteristics.

A test signal generation circuit 290 is provided in the high definition VCR 200 to generate a test signal in response to a switching control signal which is generated according to the selected recording mode and to pass the generated test signal at a predetermined frequency band. The test signal from the test signal generation circuit 290 is used to discriminate the tape and channel characteristics.

A recording amplifier 300 is also provided in the high definition VCR 200 to amplify an output signal from the channel modulator 280 or the test signal from the test signal generation circuit 290 by a predetermined level under control of a switch SW14.

Heads HD11 and HD12 are also provided in the high definition VCR 200 to record an output signal from the recording amplifier 300 on the tape.

Heads HD13 and HD14 are also provided in the high definition VCR 200 to play back a video signal or the test signal recorded on the tape when a playback mode of the high definition VCR 200 is selected by the user.

The high definition VCR 200 also comprises a playback amplifier 310 for amplifying the video signal or the test signal played back by the heads HD13 and HD14 by a predetermined level, a tape characteristic detection circuit 320 for receiving an output signal from the playback amplifier 310 under control of a switch SW15 not shown discriminating the tape and channel characteristics in response to the received signal, an equalizer 330 for compensating for distortion of the output signal from the playback amplifier 310 in response to a first output signal from the tape characteristic detection circuit 320, and a channel demodulator 340 for demodulating an output signal from the equalizer 330 at a frequency band suitable to the tape and channel characteristics in response to a second output signal from the tape characteristic detection circuit 320.

A deformatter/error correction decoder circuit 350 is also provided in the high definition VCR 200 to deformat an output signal from the channel demodulator 340 into the original state and correct an error of the resultant data stream.

An inverse scaler 360 is also provided in the high definition VCR 200 to perform inverse scaling of an output signal from the deformatter/error correction decoder circuit 350 to extract the motion data MV, the DCT coefficient data $V_{DCT}$ and the control data Pctl therefrom and output the extracted data MV, $V_{DCT}$ and Pctl to the decoder 130 in the television receiver 100 through a switch SW1.

A decoder 370 is also provided in the high definition VCR 200 to decode the output data MV, $V_{DCT}$ and Pctl from the inverse scaler 360 to expand them into states before their compression.

A D/A converter 380 is also provided in the high definition VCR 200 to convert an output signal from the decoder 370 into an analog signal and output the analog signal to a monitor (not shown) connected to the camera or the camcorder.

Figure 3:
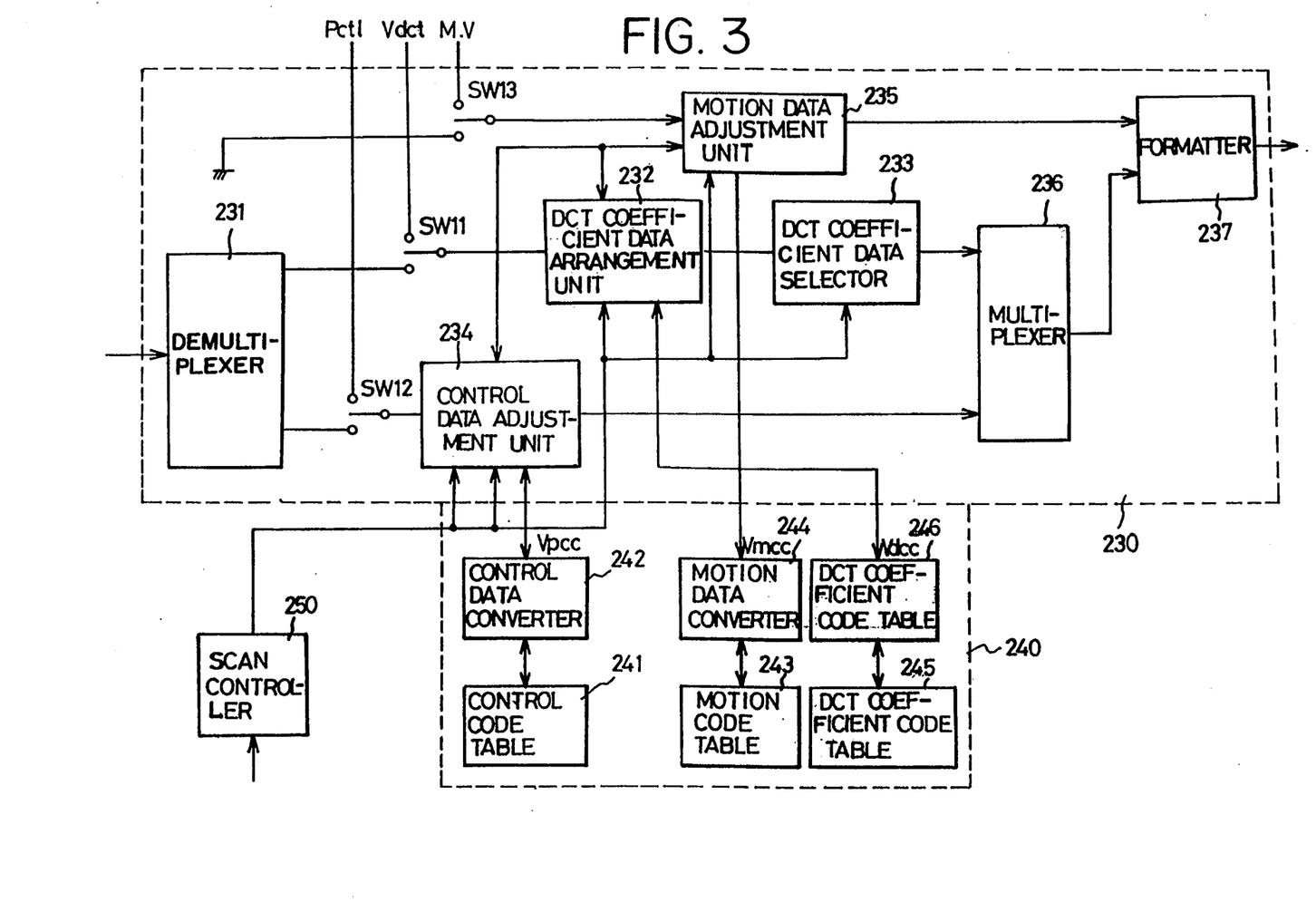
FIG. 3 is a detailed block diagram of a scaler and a variable length coder in FIG. 2.

Referring to FIG. 3, there is shown a detailed block diagram of the scaler 230 and the variable length coder 240. As shown in this drawing, the scaler 230 includes a demultiplexer 231 for demultiplexing the output signal from the encoder 220, a switch SW11 for selecting one of an output signal from the demultiplexer 231 and the DCT coefficient data $V_{DCT}$ from the decoder 130, a switch SW12 for selecting one of the output signal from the demultiplexer 231 and the control data Pctl from the decoder 130, a switch SW13 for selecting one of the motion data MV from the decoder 130 and a ground GND, a DCT coefficient data arrangement unit 232 for applying an output signal from the switch SW11 to the variable length coder 240 and compressing the coded DCT coefficient data from the variable length coder 240 in response to the scale control signal SCS from the scale controller 250, and a DCT coefficient data selector 233 for removing unnecessary DCT coefficient data from an output signal from the DCT coefficient data arrangement unit 232 in response to the scale control signal SCS from the scale controller 250.

A control data adjustment unit 234 is provided in the scaler 230 to apply an output signal from the switch SW12 to the variable length coder 240, compress the coded control data from the variable length coder 240 in response to the scale control signal SCS from the scale controller 250 and adjust a size of the compressed control data in response to the output signal from the DCT coefficient data arrangement unit 232.

A motion data adjustment unit 235 is also provided in the scaler 230 to apply an output signal from the switch SW13 to the variable length coder 240, compress the coded motion data from the variable length coder 240 in response to the scale control signal SCS from the scale controller 250 and adjust a size of the compressed motion data in response to the output signal from the DCT coefficient data arrangement unit 232.

Also, the scaler 230 includes a multiplexer 236 for multiplexing an output signal from the DCT coefficient data selector 233 and an output signal from the control data adjustment unit 234, and a formatter 237 for formatting an output signal from the multiplexer 236 and an output signal from the motion data adjustment unit 235 into the data stream.

The variable length coder 240 includes a control code table 241 for storing control data code values for the variable length coding, a control data converter 242 for converting an output code from the control code table 241 into control data and outputting the converted control data to the control data adjustment unit 234 in the scaler 230, a motion code table 243 for storing motion data code values for the variable length coding, a motion data converter 244 for converting an output code from the motion code table 243 into motion data and outputting the converted motion data to the motion data adjustment unit 235 in the scaler 230, a DCT coefficient code table 245 for storing DCT coefficient data code values for the variable length coding, and a DCT coefficient data converter 246 for converting an output code from the DCT coefficient code table 245 into DCT coefficient data and outputting the converted DCT coefficient data to the DCT coefficient data arrangement unit 232 in the scaler 230.

Figure 4:
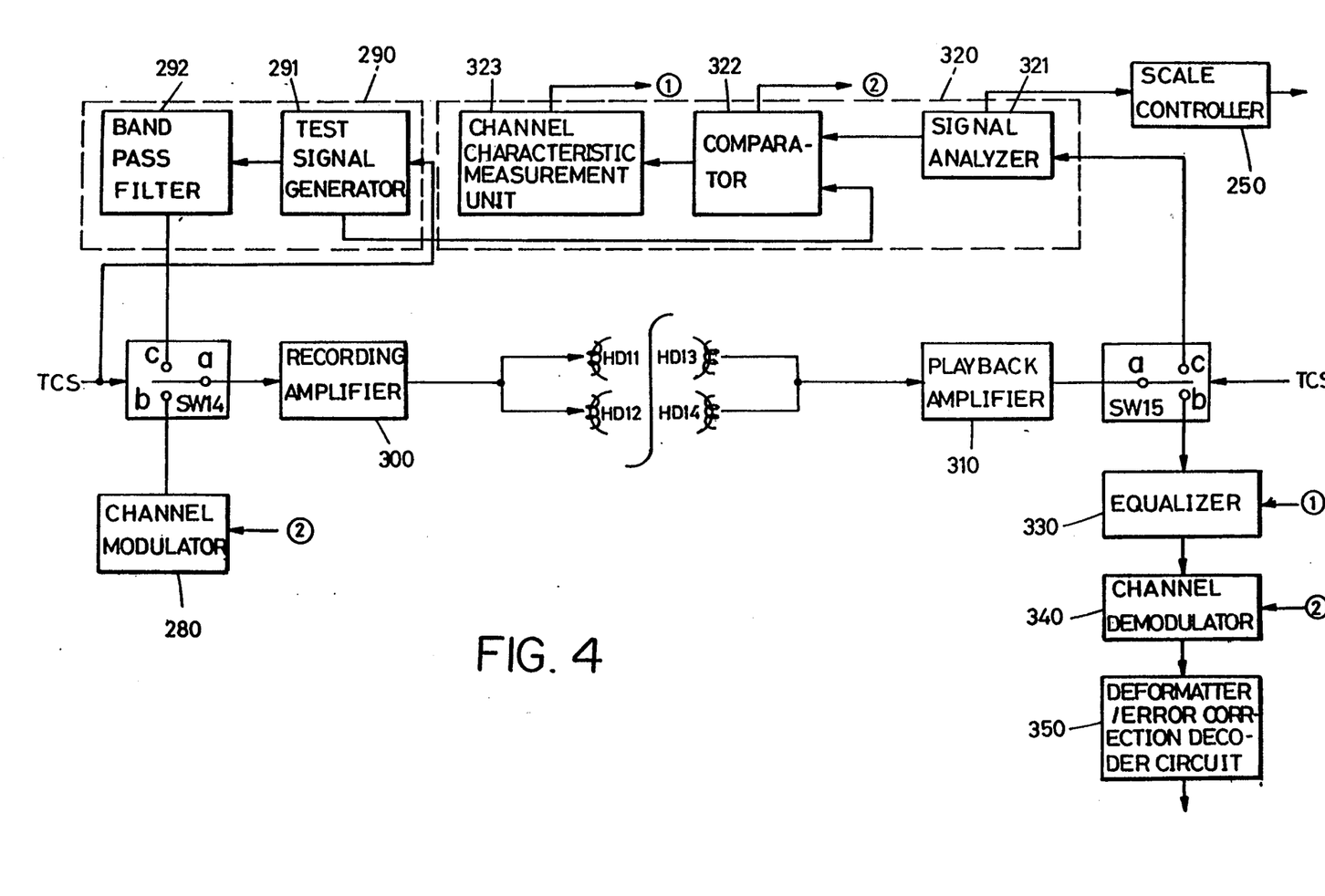
FIG. 4 is a detailed block diagram of test signal generation and tape characteristic detection circuits in FIG. 2.
Figure 5:
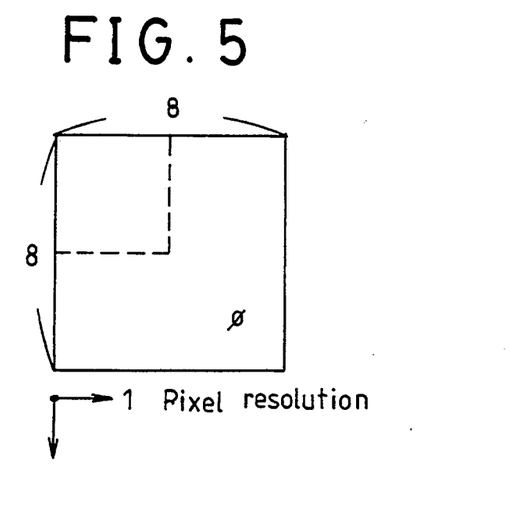
FIGS. 5 to 9 are views illustrating a process in which a video signal is compressed according to tape and channel characteristics.
Figure 6:
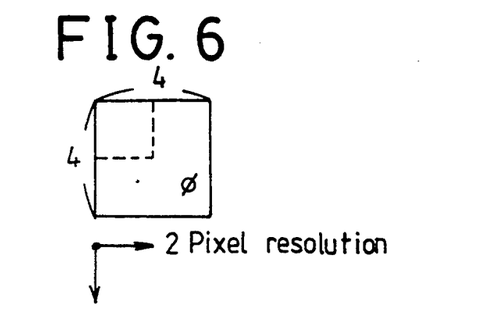
Figure 7:
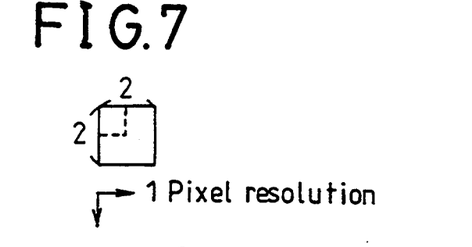
Figure 8:
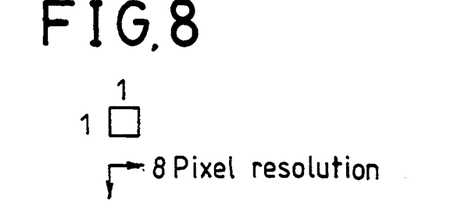
Figure 9:
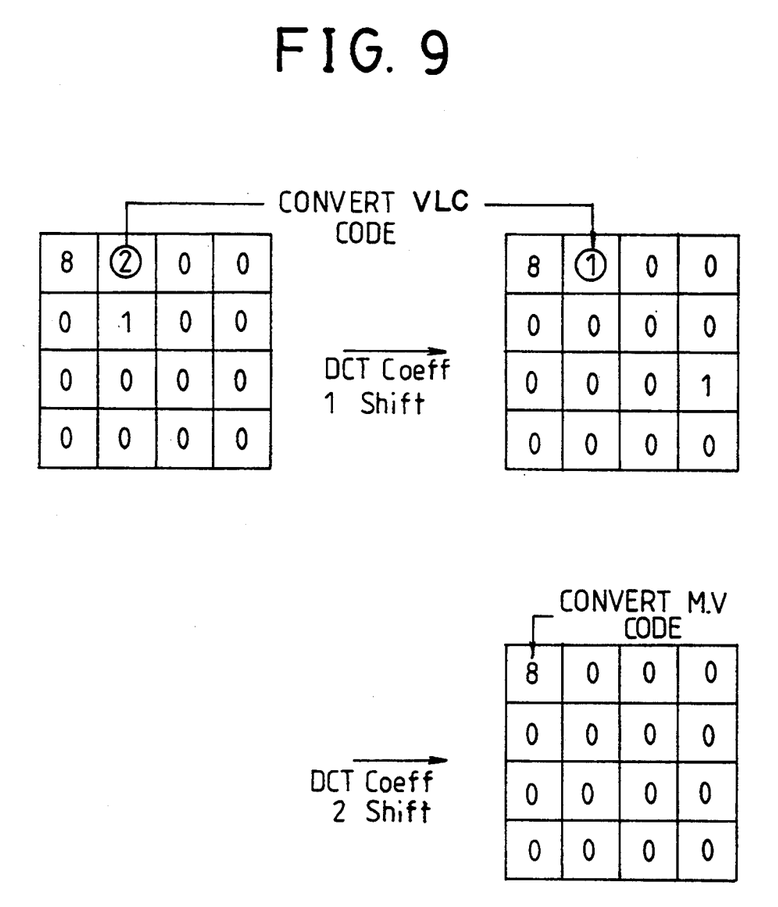

Referring to FIG. 4, there is shown a detailed block diagram of the test signal generation circuit 290 and the tape characteristic detection circuit 320. As shown in this drawing, the test signal generation circuit 290 includes a test signal generator 291 for generating the test signal in response to the switching control signal TCS which is generated according to the selected recording mode, and a band pass filter 292 for passing the generated test signal from the test signal generator 291 at the predetermined frequency band and outputting the resultant test signal to the recording amplifier 300 through the switch SW14.

The tape characteristic detection circuit 320 includes a signal analyzer 321 for discriminating the tape and channel characteristics in response to the output signal from the playback amplifier 310 and controlling the scale controller 250 in accordance with the discriminated result, a comparator 322 for comparing a frequency characteristic of an output signal from the signal analyzer 321 with that of the test signal from the test signal generation circuit 290 and applying the second output signal to the channel modulator 280 and the channel demodulator 340 in accordance with the compared result to adjust the frequency bands thereof, and a tape characteristic measurement unit 323 for detecting an error of the played back test signal in response to an output signal from the comparator 322, varying a filter coefficient of the band pass filter 292 in such a manner that the detected error becomes smaller than a predetermined threshold value and outputting the varied filter coefficient as the first output signal to the equalizer 330 to determine a filter coefficient thereof.

The operation of the high definition VCR with the above-mentioned construction in accordance with the embodiment of the present invention will hereinafter be described in detail with reference to FIGS. 2 to 10.

First, in the high definition television receiver 100, the compressed high definition video signal Vi transmitted from the broadcasting station is detected by the tuner 110 and then demodulated by the demodulator 120. The demodulated video signal from a demodulator 120 is decoded at the fixed length and then deformatted by the decoder 130. Namely, the decoder 130 extracts the motion data MV, the DCT coefficient data $V_{DCT}$ and the control data Pctl from the demodulated video signal from the demodulator 120, decodes the extracted data MV, $V_{DCT}$ and Pctl at the fixed length and performs the inverse quantization and inverse DCT of the decoded data. The resultant digital video signal from the decoder 130 is applied to the D/A converter 140. Also, the extracted motion data MV, DCT coefficient data $V_{DCT}$ and control data Pctl from the decoder 130 are applied to the scaler 230 in the high definition VCR 200 through the switch SW1.

In the case where the high definition television receiver 100 is selected by the user, the digital video signal from the decoder 130 is applied to the D/A converter 140 through the switch SW1 and then converted into the analog video signal thereby. The analog video signal from the D/A converter 140 is displayed through the monitor of the television receiver 100.

On the other hand, in the case where the recording mode of the high definition VCR 200 is selected by the user, the switching control signal TCS is generated according to the selected recording mode and then applied to the test signal generation circuit 290. In the test signal generation circuit 290, the test signal generator 291 generates the test signal indicative of the tape and channel characteristics in response to the switching control signal TCS. The test signal from the test signal generator 291 is passed at the predetermined frequency band by the band pass filter 292 and then applied to the recording amplifier 300 through the switch SW14. As a result, the resultant test signal from the test signal generation circuit 290 is amplified by the recording amplifier 300 and then recorded on the tape by the heads HD11 and HD12.

Then, the playback mode of the high definition VCR 200 is set upon completion of the recording of the test signal. In this case, the test signal detected by the heads HD13 and HD14 is amplified by the predetermined level by the playback amplifier 310 and then applied to the tape characteristic detection circuit 320 through the switch SW15 depending on the switching control signal TSC.

In the tape characteristic detection circuit 320, the signal analyzer 321 analyzes the output signal from the playback amplifier 310 to discriminate the tape and channel characteristics. The scale control signal from the scale controller 250 is applied to the scaler 230, being varied as a result of the analysis by the signal analyzer 321.

Also in the tape characteristic detection circuit 320, the comparator 322 compares the frequency characteristic of the output signal from the signal analyzer 321 with that of the test signal from the test signal generation circuit 290 to discriminate the tape characteristic and the channel characteristic or a recording/playback characteristic. As a result of the comparison, the comparator 322 applies the second output signal to the channel modulator 280 and the channel demodulator 340 to adjust the frequency bands thereof. Therefore, the channel modulator 280 and the channel demodulator 340 perform the modulation and demodulation at the frequency bands suitable to the tape and channel characteristics.

The output signal from the comparator 322 is also applied to the tape characteristic measurement unit 323. In the tape characteristic measurement unit 323, the error $\epsilon i$ is greater than the predetermined threshold value $\epsilon_{TH}$, then it is compared with a minimum allowable value $\epsilon min$. In this case, if the minimum allowable value $\epsilon min$ is greater than the detected error $\epsilon i$, it is set as the detected error $\epsilon i$ with respect to a certain frame, thereby causing the filter coefficient of the band pass filter 292 to be adjusted.

Then, the test signal from the test signal generator 291 is passed through the band pass filter 292 at the adjusted filter coefficient and then applied to the recording amplifier 300 through the switch SW14. As a result, the test signal from the test signal generation circuit 290 is amplified by the recording amplifier 300 and then recorded on the tape by the heads HD11 and HD12. Again, the test signal recorded on the tape is applied to the tape characteristic detection circuit 320 through the playback amplifier 310 and the switch SW15. In the tape characteristic detection circuit 320, the signal analyzer 321 analyzes the output signal from the playback amplifier 310 to discriminate the tape and channel characteristics. The scale control signal from the scale controller 250 is applied to the scaler 230, being varied as a result of the analysis by the signal analyzer 321. Also in the tape characteristic detection circuit 320, the comparator 322 compares the frequency characteristic of the output signal from the signal analyzer 321 with that of the test signal from the test signal generation circuit 290 to discriminate the tape and channel characteristics. As a result of the comparison, the comparator 322 applies the second output signal to the channel modulator 280 and the channel demodulator 340 to adjust the frequency bands thereof. The output signal from the comparator 322 is also applied to the tape characteristic measurement unit 323. Then, the tape characteristic measurement unit 323 detects the error $\epsilon i$ of the test signal passed at the varied filter coefficient in response to the output signal from the comparator 322. If the detected error $\epsilon i$ is greater than the predetermined threshold value $\epsilon_{TH}$, the above operation is repeatedly performed.

In other words, the error of the test signal passed through the band pass filter 292 at the varied filter coefficient is detected and then compared with the predetermined threshold value $\epsilon_{TH}$ in the tape characteristic measurement unit 323. If the detected error $\epsilon i$ of the test signal is smaller than the predetermined threshold value $\epsilon_{TH}$, the filter coefficient of the band pass filter 292 is applied to the equalizer 330 for adjustment of the filter coefficient thereof. On the contrary, if the detected error $\epsilon i$ of the test signal is greater than the predetermined threshold value $\epsilon_{TH}$, the above operation is repeatedly performed until the detected error $\epsilon i$ of the test signal becomes smaller than the predetermined threshold value $\epsilon_{TH}$.

In this manner, in the case where the recording mode of the high definition VCR 200 is selected by the user, contacts "a" of the switches SW14 and SW15 are connected to contacts c thereof for a predetermined time period in response to the switching control signal so that the tape and channel characteristics can be detected, and the frequency bands of the channel modulator 280, equalizer 330 and channel demodulator 340 are determined in accordance with the detected result. Also, the scale control signal from the scale controller 250 is controlled in accordance with the detected result. Thereafter, after the lapse of the predetermined time period, contacts "b" of the switches SW14 and SW15 are connected to contacts a thereof. As a result, the recording and playback of the video signal are performed.

First, the analog video signal AVi from the view finder of the camera or the camcorder is received and then converted into the digital video signal by the A/D converter 210. The encoder 220 encodes the output signal from the A/D converter 210 suitably to the recording format.

The scale control signal SCS from the scale controller 250 is applied to the scaler 230 according to the selected one of the recording modes SP, LP and SLP. The scaler 230 selects the output signal from the encoder 220 or the output data MV, $V_{DCT}$ and Pctl from the decoder 130 in the high definition television receiver 100 through the switch SW1 and formats the selected signal or data into the data stream in response to the scale control signal SCS from the scale controller 250.

Namely, as shown in FIG. 3, in the scaler 230, the demultiplexer 231 demultiplexes the output signal from the encoder 220 for data separation therefrom. In response to the switching control signal, the switch SW11 selects one of the separated data from the demultiplexer 231 and the DCT coefficient data $V_{DCT}$ from the decoder 130 and the switch SW12 selects one of the separated data from the demultiplexer 231 and the control data Pctl from the decoder 130. Also, the switch SW13 selects one of the motion data MV from the decoder 130 and the ground GND.

The output data from the switch SW11 is applied to the DCT coefficient code table 245 in the variable length coder 240. Outputted from the DCT coefficient code table 245 is a code value corresponding to the output data from the switch SW11. Namely, the output data from the switch SW11 is coded at a variable length at a compression rate determined by the scale control signal from the scale controller 250. The DCT coefficient code from the DCT coefficient code table 245 is converted into the DCT coefficient data by the DCT coefficient data converter 246 in the variable length coder 240.

The converted DCT coefficient data from the DCT coefficient data converter 246 is applied to the DCT coefficient data arrangement unit 232 in the scaler 230 and then arranged thereby for the formatting of the data stream. The size of the arranged DCT coefficient data is adjusted by the scale control signal from the scale controller 250.

The DCT coefficient data selector 233 in the scaler 230 is adapted to remove unnecessary DCT coefficient data from the output signal from the DCT coefficient data arrangement unit 232 in response to the scale control signal SCS from the scale controller 250. Namely, pixel resolution is performed to reduce the size of the variable length-coded DCT coefficient data, as shown in FIGS. 5 to 9, which are views illustrating a process in which the video signal is compressed according to the tape and channel characteristics.

The output data from the switch SW12 is applied to the control code table 241 in the variable length coder 240, which outputs a control code value corresponding to the output data from the switch SW12. The control code value from the control code table 241 is converted into the control data by the control data converter 242 in the variable length coder 240.

Then, the control data from the control data converter 242 is applied to the control data adjustment unit 234 in the scaler 230. The control data adjustment unit 234 compresses the control data from the control data converter 242 in response to the scale control signal SCS from the scale controller 250 and adjusts the size of the compressed control data in response to the output signal from the DCT coefficient data arrangement unit 232.

The output data from the switch SW13 is applied to the motion code table 243 in the variable length coder 240, which outputs a motion code value corresponding to the output data from the switch SW13. The motion code value from the motion code table 243 is converted into the motion data by the motion data converter 244 in the variable length coder 240.

Then, the motion data from the motion data converter 244 is applied to the motion data adjustment unit 235 in the scaler 230. The motion data adjustment unit 235 compresses the motion data from the motion data converter 244 in response to the scale control signal SCS from the scale controller 250 and adjusts the size of the compressed motion data in response to the output signal from the DCT coefficient data arrangement unit 232.

Subsequently, the multiplexer 236 in the scaler 230 multiplexes the output signal from the DCT coefficient data selector 233 and the output signal from the control data adjustment unit 234. The formatter 237 in the scaler 230 formats the output signal from the multiplexer 236 and the output signal from the motion data adjustment unit 235 into the data stream.

The data stream from the scaler 230 is sent to the error correction coder 260, which adds the error correction code to the data stream from the scaler 230. The formatter 270 formats the output signal from the error correction coder 260 in the recording format on the tape.

The output signal from the formatter 270 is modulated by the channel modulator 280 at the frequency band determined by the output signal from the comparator 322 in the tape characteristic detection circuit 320, and then applied to the recording amplifier 300 through a contact "b" of the switch SW14. As a result, the output signal from the channel modulator 280 is amplified by the recording amplifier 300 and then recorded on the tape by the heads HD11 and HD12.

In the case where the playback mode of the high definition VCR 200 is selected by the user, the data stream of the video signal recorded on the tape is played back by the heads HD13 and HD14 and then amplified by the playback amplifier 310. The output signal from the playback amplifier 310 is applied to the equalizer 330 through the contact "b" of the switch SW15.

The equalizer 330 is adapted to compensate for the distortion of the output signal from the playback amplifier 310 in response to the output signal from the tape characteristic measurement unit 323 in the tape characteristic detection circuit 320. The output signal from the equalizer 330 is demodulated by the channel demodulator 340 at the frequency band determined by the output signal from the comparator 322 in the tape characteristic detection circuit 320. The output signal from the channel demodulator 340 is applied to the deformatter/error correction decoder circuit 350.

The deformatter/error correction decoder circuit 350 deformats the output signal from the channel demodulator 340 into the original state and then corrects the error of the resultant data stream. The inverse scaler 360 functions to perform the inverse scaling of the output signal from the deformatter/error correction decoder circuit 350 to extract the motion data MV, the DCT coefficient data $V_{DCT}$ and the control data Pctl therefrom. The extracted data MV, $V_{DCT}$ and Pctl from the inverse scaler 360 is applied to the decoder 130 in the television receiver 100 through the switch SW1. The decoder 130 decodes the output data MV, $V_{DCT}$ and Pctl from the inverse scaler 360 to expand them into the states before their compression. The resultant digital video signal from the decoder 130 is applied to the D/A converter 140 and then converted into the analog video signal thereby. Then, the analog video signal from the D/A converter 140 is displayed through the monitor of the television receiver 100.

Also, the extracted data MV, $V_{DCT}$ and Pctl from the inverse scaler 360 is applied to the decoder 370. The decoder 370 decodes the output data MV, $V_{DCT}$ and Pctl from the inverse scaler 360 to expand them into the states before their compression. The resultant digital video signal from the decoder 370 is applied to the D/A converter 380 and then converted into the analog video signal thereby. Subsequently, the analog video signal from the D/A converter 380 is displayed through the monitor connected to the camera or the camcorder.

Figure 10:
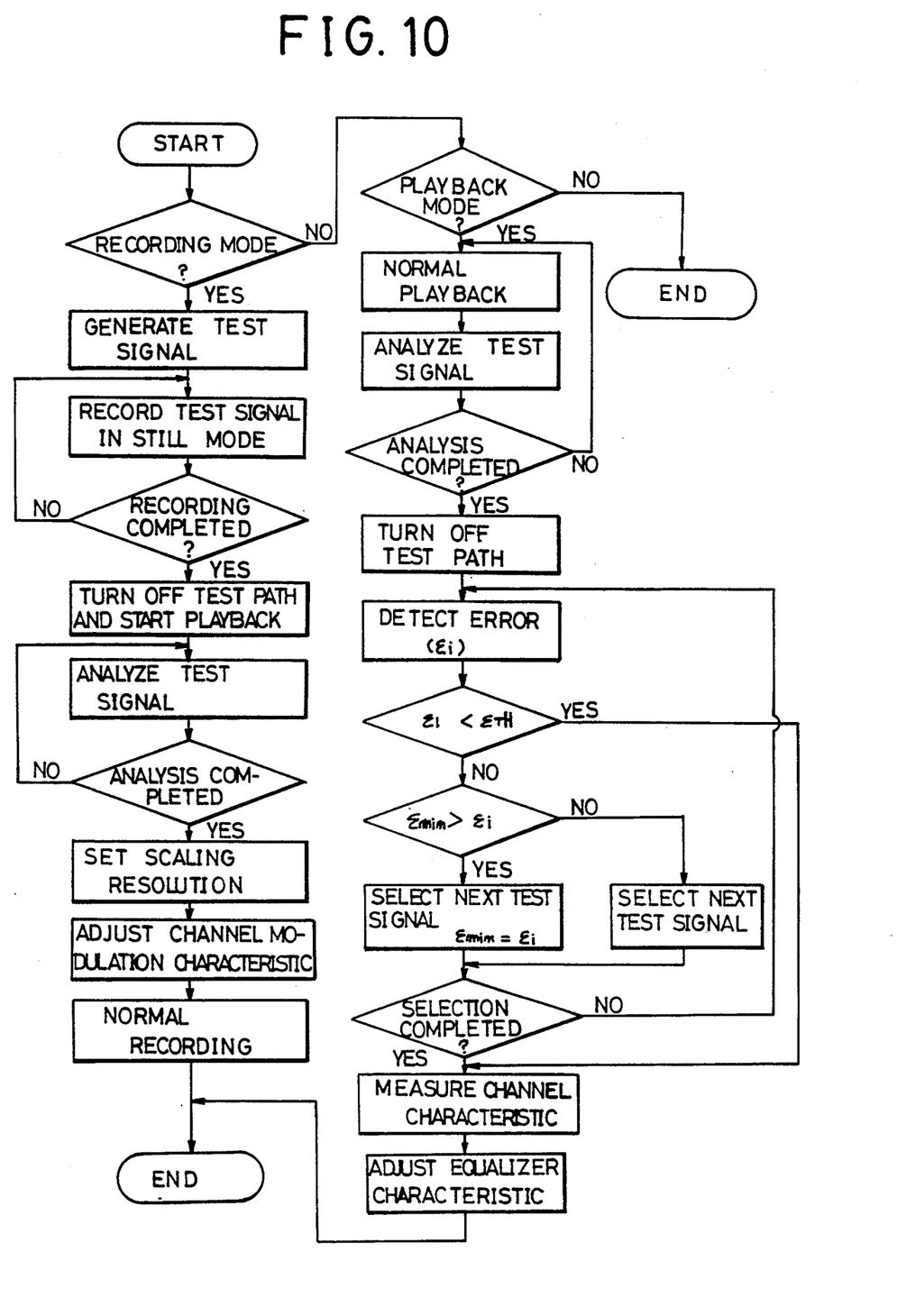
FIG. 10 is a flowchart illustrating a signal characteristic variation operation in accordance with the present invention.

The above-mentioned operation of the high definition VCR will hereinafter be described in more detail with reference to FIG. 10, which is a flowchart illustrating a signal characteristic variation operation in accordance with the present invention.

First, if the recording mode of the high definition VCR is selected by the user, the contact "a" of the switch SW14 is connected to the contact "c" thereof and, at the same time, the test signal is generated. The generated test signal is recorded on the tape in a still mode.

Upon completion of the recording of the test signal on the tape, the recording mode is stopped and the playback of the recorded test signal is started. In this case, the contact a of the switch SW15 is connected to the contact "c" thereof and the recorded test signal is played back in the still mode. The played back test signal is analyzed.

The tape and channel characteristics are discriminated on the basis of the analysis of the played back test signal, and the scale controller 250 and the channel modulator 280 are controlled in accordance with the discriminated result. Therefore, the input video data is modulated at the frequency band suitable to the tape and channel characteristics and then recorded on the tape.

On the other hand, in the case where the playback mode of the high definition VCR is selected by the user, the test signal recorded on the tape is amplified by the playback amplifier 310 and then applied to the tape characteristic detection circuit 320 through the contact "c" of the switch SW15. The tape and channel characteristics are discriminated on the basis of the analysis of the played back test signal. Upon completion of the analysis of the played back test signal, the contact b of the switch SW15 is connected to the contact "a" thereof.

In this case, the error $\epsilon i$ of the played back test signal is detected and then compared with the predetermined threshold value $\epsilon_{TH}$. If the detected error $\epsilon i$ of the test signal is smaller than the predetermined threshold value $\epsilon_{TH}$, the tape characteristic is measured and the filter coefficient of the band pass filter 292 is then adjusted. On the other hand, if the detected error $\epsilon i$ is greater than the predetermined threshold value $\epsilon_{TH}$, then it is compared with the minimum allowable value $\epsilon min$. In this case, if the minimum allowable value $\epsilon min$ is greater than the detected error $\epsilon i$, it is set as the detected error $\epsilon i$ and the filter coefficient of the band pass filter 292 is then adjusted.

Then, the test signal passed through the band pass filter 292 at the adjusted filter coefficient is recorded on the tape, and the error thereof is again detected and compared with the minimum allowable value $\epsilon min$. If the detected error $\epsilon i$ of the test signal is smaller than the minimum allowable value $\epsilon min$, the above operation is repeatedly performed until the detected error $\epsilon i$ of the test signal becomes greater than the minimum allowable value $\epsilon min$. At that time that the detected error $\epsilon i$ of the test signal becomes greater than the minimum allowable value $\epsilon min$, the filter coefficient of the equalizer 330 is determined according to the filter coefficient of the band pass filter 292.

With the tape and channel characteristics analyzed through the above-mentioned operation, the scale controller 250, the channel modulator 280, the equalizer 330 and the channel demodulator 340 are controlled so that the video data can be modulated and demodulated at the frequency bands suitable to the tape and channel characteristics and then recorded and played back on/from the tape.

Alternatively, the video data decoded at the fixed length by the decoder 130 in the television receiver 100 may be applied to the scaler 230 in the high definition VCR 200. In this case, the scaler 230 formats the decoded video data from the decoder 130 into the data stream and then applied the data stream to the variable length coder 240. Then, the variable length-coded video data from the variable length coder 240 is received by the error correction coder 260.

Figure 11:
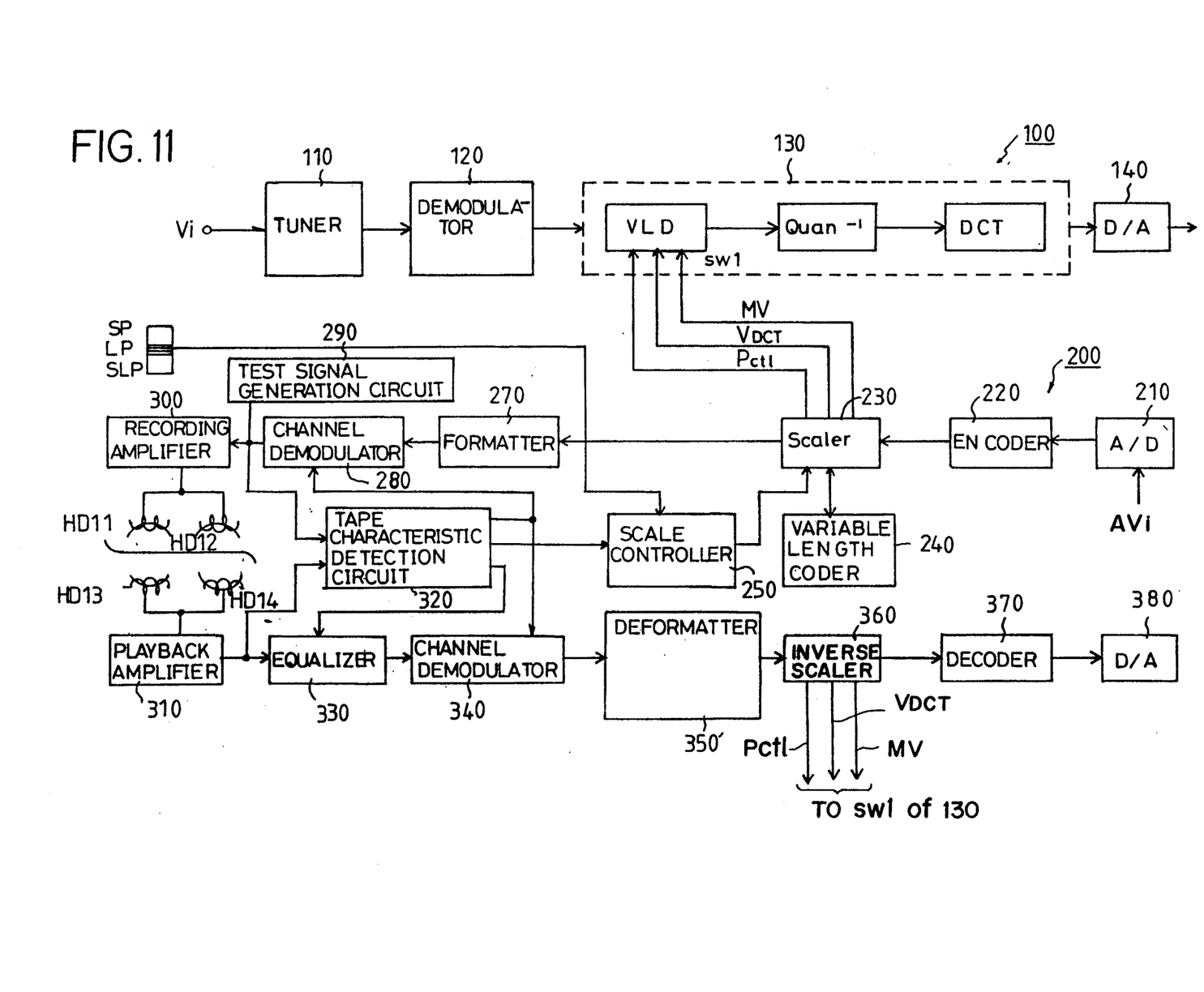
FIG. 11 is a block diagram of a signal characteristic variation apparatus for a high definition VCR connected to a high definition television receiver in accordance with an alternative embodiment of the present invention.

Referring to FIG. 11, there is shown a block diagram of a signal characteristic variation apparatus for a high definition VCR connected to a high definition television receiver in accordance with an alternative embodiment of the present invention. In this embodiment, it is assumed that the error correction code is compressed and transmitted by the broadcasting station, being added to the video signal. In this connection, the construction of this drawing is the same as that of FIG. 2, with the exception that the error correction coder 260 is removed and the deformatter/error correction decoder circuit 350 is replaced by only a deformatter 350'.

In operation, the scaler 230 formats the compressed data extracted by the television receiver 100 or the output signal from the encoder 220 into the data stream and then applies the data stream to the formatter 270. The formatter 270 formats the output signal from the scaler 230 in the recording format on the tape. The procedure of recording the output signal from the formatter 270 on the tape is the same as that in the first embodiment of FIG. 2 and a detailed description thereof will thus be omitted.

In the playback of the video data recorded on the tape, the output signal from the channel demodulator 340 is applied to the deformatter 350'. The deformatter 350' functions to deformat the output signal from the channel demodulator 340 into the original state. The procedure of displaying the output signal from the deformatter 350' through the monitor of the television receiver 100 or the monitor connected to the camera or the camcorder is the same as that in the first embodiment of FIG. 2 and a detailed description thereof will thus be omitted.

Noticeably, the error of the output signal from the inverse scaler 360 is extracted and corrected on the basis of the error correction code transmitted from the broadcasting station by the decoder 130 in the television receiver. In other words, in the second embodiment of the present invention, the decoder 130 in the television receiver 100 is adapted to extract and correct the error inserted in the transmission and reception of the video data or generated in the recording and playback of the high definition VCR.

As apparent from the above description according to the present invention, the test signal of the predetermined frequency band is recorded and played back on/from the tape for discrimination of the tape and channel characteristics in the recording mode. Therefore, the video signal can stably be recorded on the tape with its characteristic adjusted according to the discriminated tape and channel characteristics. Also, in the playback mode, the tape and channel characteristics are discriminated by detecting the test signal recorded on the tape. Therefore, the video signal can stably be played back from the tape with its frequency characteristic adjusted according to the discriminated tape and channel characteristics.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A signal characteristic variation apparatus for a high definition video cassette recorder, comprising:
    scaling means for selecting an output signal from an encoder or output data from a decoder in a television receiver under control of a first switch and formatting the selected signal or data into a data stream;
    variable length coding means for coding the output signal from said encoder or motion data, control data and DCT coefficient data output from said decoder at a variable length and outputting the coded data to said scaling means;

scale control means for outputting a scale control signal to said scaling means according to a selected one of recording modes;

error correction coding means for adding an error correction code to an output signal from said scaling means;

formatting means for formatting an output signal from said error correction coding means in a recording format on a tape;

channel modulation means for modulating an output signal from said formatting means at a frequency band suitable to tape and channel characteristics;

test signal generation means for generating a test signal in response to a switching control signal which is generated according to the selected recording mode and passing the generated test signal at a predetermined frequency band, the test signal from said test signal generation means being used to discriminate the tape and channel characteristics;

recording amplification means for amplifying an output signal from said channel modulation means or the test signal from said test signal generation means by a predetermined level under control of a second switch;

first and second heads for recording an output signal from said recording amplification means on the tape;

third and fourth heads for playing back a video signal or the test signal recorded on the tape in a playback mode;

playback amplification means for amplifying the video signal or the test signal played back by said third and fourth heads by a predetermined level;

tape characteristic detection means for receiving an output signal from said playback amplification means under control of a third switch and discriminating the tape and channel characteristics in response to the received signal;

equalization means for compensating for distortion of the output signal from said playback amplification means in response to a first output signal from said tape characteristic detection means;

channel demodulation means for demodulating an output signal from said equalization means at a frequency band suitable to the tape and channel characteristics in response to a second output signal from said tape characteristic detection means;

deformatting and error correction decoding means for deformatting an output signal from said channel demodulation means into the original state and correcting an error of the resultant data stream; and inverse scaling means for performing inverse scaling of an output signal from said deformatting and error correction decoding means to extract motion data, the DCT coefficient data and the control data therefrom and outputting the extracted data to said decoder in said television receiver.

2. A signal characteristic variation apparatus for a high definition video cassette recorder, as set forth in claim 1, wherein said scaling means includes:

a demultiplexer for demultiplexing an output signal from said encoder;

a fourth switch for selecting one of an output signal from said demultiplexer and the DCT coefficient data from said decoder;

a fifth switch for selecting one of the output signal from said demultiplexer and the control data from said decoder;

a sixth switch for selecting one of the motion data from the decoder and a ground;

a DCT coefficient data arrangement unit for applying an output signal from said fourth switch to said variable length coding means and compressing the coded DCT coefficient data from said variable length coding means in response to the scale control signal from said scale control means;

a DCT coefficient data selector for removing unnecessary DCT coefficient data from an output signal from said DCT coefficient data arrangement unit in response to the scale control signal from said scale control means;

a control data adjustment unit for applying an output signal from said fifth switch to said variable length coding means, compressing the coded control data from said variable length coding means in response to the scale control signal from said scale control means and adjusting a size of the compressed control data in response to the output signal from said DCT coefficient data arrangement unit;

a motion data adjustment unit for applying an output signal from said sixth switch to said variable length coding means, compressing the coded motion data from said variable length coding means in response to the scale control signal from said scale control means and adjusting a size of the compressed motion data in response to the output signal from said DCT coefficient data arrangement unit;

a multiplexer for multiplexing an output signal from said DCT coefficient data selector and an output signal from said control data adjustment unit; and a formatter for formatting an output signal from said multiplexer and an output signal from said motion data adjustment unit into the data stream.

3. A signal characteristic variation apparatus for a high definition video cassette recorder, as set forth in claim 1, wherein said variable length coding means includes:

a control code table for storing control data code values for the variable length coding;

a control data converter for converting an output code from said control code table into control data and outputting the converted control data to said scaling means;

a motion code table for storing motion data code values for the variable length coding;

a motion data converter for converting an output code from said motion code table into motion data and outputting the converted motion data to said scaling means;

a DCT coefficient code table for storing DCT coefficient data code values for the variable length coding; and a DCT coefficient data converter for converting an output code from said DCT coefficient code table into DCT coefficient data and outputting the converted DCT coefficient data to said scaling means.

4. A signal characteristic variation apparatus for a high definition video cassette recorder, as set forth in claim 1, wherein said test signal generation means includes:

a test signal generator for generating the test signal in response to the switching control signal which is generated according to the selected recording mode; and a band pass filter for passing the generated test signal from said test signal generator at the predetermined frequency band and outputting the resultant test signal to said recording amplification means through said second switch.

5. A signal characteristic variation apparatus for a high definition video cassette recorder, as set forth in claim 4, wherein said tape characteristic detection means includes:

a signal analyzer for discriminating the tape and channel characteristics in response to the output signal from said playback amplification means and controlling said scale control means in accordance with the discriminated result;

a comparator for comparing a frequency characteristic of an output signal from said signal analyzer with that of the test signal from said test signal generation means and applying the second output signal to said channel modulation means and said channel demodulation means in accordance with the compared result to adjust the frequency bands thereof; and a tape characteristic measurement unit for detecting an error of the played-back test signal in response to an output signal from said comparator, varying a filter coefficient of said band pass filter in said test signal generation means in such a manner that the detected error becomes smaller than a predetermined threshold value and outputting the varied filter coefficient as the first output signal to said equalization means to determine a filter coefficient thereof.

6. A signal characteristic variation apparatus for a high definition video cassette recorder, as set forth in claim 1, further comprising:

analog/digital conversion means for receiving an analog video signal from a view finder of a camera or a camcorder and converting the received analog video signal into a digital video signal;

said encoder encoding an output signal from said analog/digital conversion means;

decoding means for decoding the motion data, the DCT coefficient data and the control data from said inverse scaling means to expand them into states before their compression; and digital/analog conversion means for converting an output signal from said decoding means into an analog signal and outputting the analog signal to a monitor connected to said camera or camcorder.

7. A signal characteristic variation apparatus for a high definition video cassette recorder, as set forth in claim 1, wherein said decoder in the television receiver extracts and corrects an error inserted in the transmission and reception of the video signal or generated in the recording and playback of the high definition VCR.

* * * * *